(12) United States Patent
Korenev et al.

(10) Patent No.: US 6,429,444 B1
(45) Date of Patent: Aug. 6, 2002

(54) REAL TIME MONITORING OF ELECTRON BEAM RADIATION DOSE

(75) Inventors: Sergey Alexandrovich Korenev, Millburn; John Masefield, Far Hills, both of NJ (US); Jerry Kriebel, Lake Villa; Stephen Scott Johnson, Antioch, both of IL (US)

(73) Assignee: Steris Inc., Temecula, CA (US)

( * ) Notice: Subject to any disclaimer, the term of this patent is extended or adjusted under 35 U.S.C. 154(b) by 0 days.

(21) Appl. No.: 09/382,051

(22) Filed: Aug. 24, 1999

(51) Int. Cl.[7] .............................................. H01J 37/244
(52) U.S. Cl. .................... 250/492.3; 250/397; 324/71.3
(58) Field of Search .............................. 250/492.3, 397; 324/71.3

(56) References Cited

U.S. PATENT DOCUMENTS

| | | | |
|---|---|---|---|
| 3,857,090 A | * 12/1974 | Chick | 250/492.21 |
| 4,467,197 A | 8/1984 | Stieber | 250/305 |
| 4,956,856 A | 9/1990 | Harding | 378/88 |
| 5,396,074 A | 3/1995 | Peck et al. | 250/453.11 |
| 5,401,973 A | 3/1995 | McKeown et al. | 250/492.3 |
| 5,451,794 A | 9/1995 | McKeown et al. | 250/492.3 |
| 5,475,228 A | * 12/1995 | Palathingal | 250/397 |

FOREIGN PATENT DOCUMENTS

GB  721235  1/1955

OTHER PUBLICATIONS

"Real Time Confirmation of Electron–Beam Dose", *Radiat. Phys. Chem.* vol. 52, Nos. 1–6, pp. 543–547, 1998.
Impela News, AECL Accelerators, Electrons Beam Newsletter, vol. 2, No. 4, Dec. 1995.
Real Time Monitoring of Electron Processors, Pergamon, 9th International Meeting on Radiation Processing, Sam V. Nablo, et al. pp. 1377–1383.

(List continued on next page.)

*Primary Examiner*—Jack Berman
(74) *Attorney, Agent, or Firm*—Fay, Sharpe, Fagan, Minnich & McKee, LLP

(57) ABSTRACT

An accelerator (10) generates an electron beam that is swept (16) up and down to form an electron beam (22). A conveyor (32) moves items (30) through the electron beam for irradiation treatment. A first array of inductive electron beam strength detectors' (40a) is disposed between the origin of the electron beam and a first item to be irradiated to measure the strength of the electron beam entering the item at a plurality of altitudes. A second array (42) of inductive electron beam strength detectors is disposed on the opposite side of the item to detect the strength of the electron beam exiting the item at the plurality of altitudes. In the illustrated embodiment, another item is positioned to be irradiated by the radiation that is passed through the first item. The second array thus detects the electron beam strength entering the second item and an analogous array (40c) measures the electron beam strength exiting the second item. A processor (54) determines the absorbed dose of radiation absorbed by each of the first and second items. The dose information is archived (56). The dose information is compared by a parameter adjustment processor (58) with target doses and deviations are used to control one or more of MeV or beam current of the electron beam, the sweep rate, and the conveying speed of the items. Each of the inductive detectors (42) includes a ferrite member, such as a ferrite ring (62). A plurality of coiled loops (64) are mounted around a periphery of the ferrite ring.

22 Claims, 2 Drawing Sheets

OTHER PUBLICATIONS

Radiation Sterilization of Packaging Materials, Presented at the Institute of Packaging Professionals, Nov. 3–4, 1995, Chicago, Illinois, pp. 1–12.

Standard Practice for Dosimetry in an Electron Beam Facility for Radiation Processing at Energies Between 300 keV and 25 MeV[1], Designation: E 1649–94, An American National Standard, pp. 823–841.

Wide–Band Current Monitors High Voltage Pulse Transformers Capacitive Voltage Dividers, Pearson Electronics, Inc. of Palo Alto, California.

Kneeland, et al. "Industrial Use of the Real Time Monitor for Quality Assurance in Electron Processing", Radiation Physics & Chemistry, NL, Elsevier Science Publishers BV., Amsterdam, V.55, N.4, Jul. 11, 1999 pp 429–436.

* cited by examiner

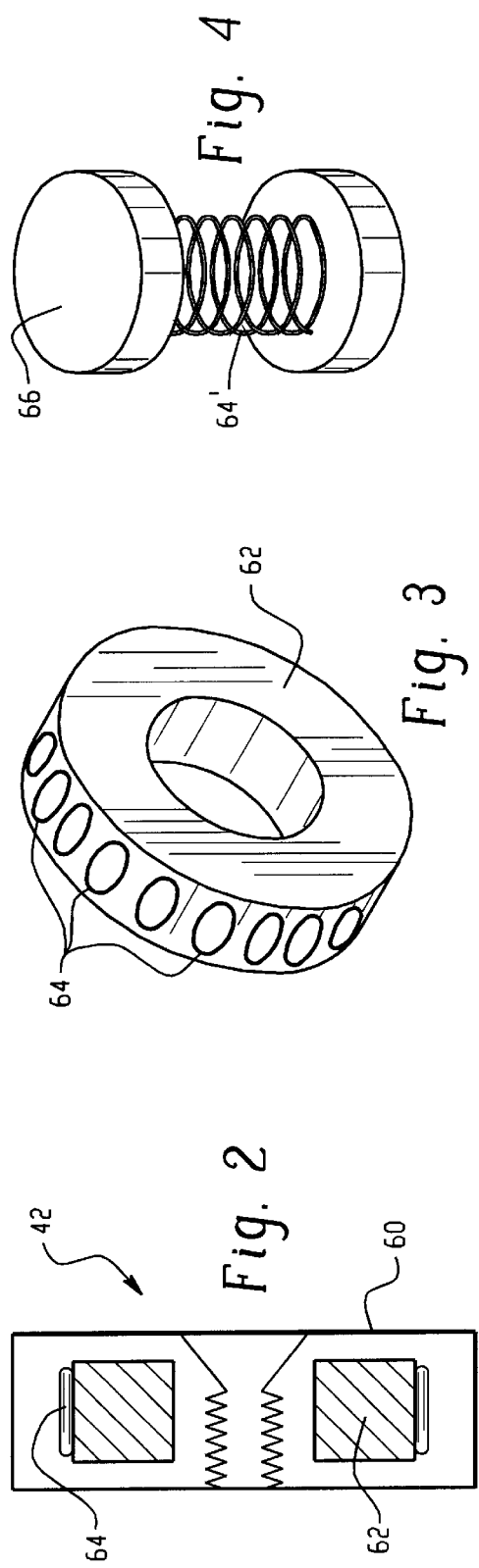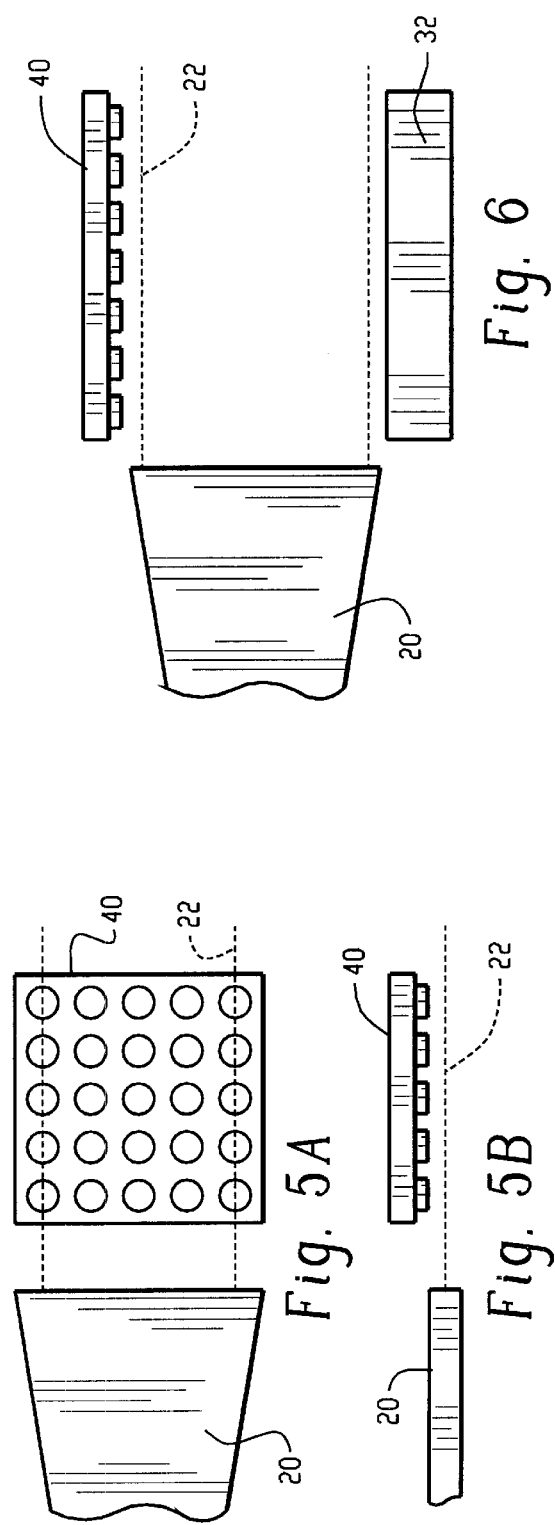

REAL TIME MONITORING OF ELECTRON BEAM RADIATION DOSE

BACKGROUND OF THE INVENTION

The present invention relates to the irradiation arts. It finds particular application in conjunction with measuring the absorbed radiation dose in systems for irradiating objects with an electron beam and will be described with particular reference thereto. It is to be appreciated, however, that the invention will also find application in conjunction with the monitoring of charged particle beams in coating by a synthesis of powdered material, surface modification of material, destruction of toxic gases, destruction of organic wastes, drying, disinfection of food stuffs, medicine, and medical devices, polymer modification, and the like.

Heretofore, electron or e-beam irradiation systems have been developed for treating objects with electron beam radiation. Typically, an accelerator generates electrons of a selected energy, typically in the range of 0.2–20 MeV. The electrons are focused into a beam through which containers carrying the items to be treated are passed. The conveying speed and the energy of the electron beam are selected such that each item in the container receives a preselected dose. Traditionally, dose is defined as the product of the kinetic energy of the electrons, the electron beam current, and the time of radiation divided by the mass of the irradiated product.

Various techniques have been developed for precalibrating the beam and measuring beam dose with either calibration phantoms or samples. These precalibration methods include measuring beam current, measuring charge accumulation, conversion of the e-beam to x-rays, heat, or secondary particles for which emitters and detectors are available, and the like. These measurements are error prone due to such factors as ionization of surrounding air, shallow penetration of the electron beam, complexity and cost of sensors, and the like.

One of the problems with precalibration methods is that they assume that the product in the containers matches the phantom and is the same from package to package. They also assume a uniform density of the material in the container. When these expectations are not met, portions of the material may be under-irradiated and other portions over-irradiated. For example, when the material in the container has a variety of densities or electron stopping powers, the material with the high electron stopping power can "shadow" the material on the other side of it from the electron beam source. That is, a high percentage of the electron beam is absorbed by the higher density material, such that less than the expected amount of electrons reach the material downstream. The variation from container to container may result in over and under dosing of some of the materials within the containers.

One technique for verifying the radiation is to attach a sheet of photographic film to the backside of the container. The photographic film is typically encased in a light opaque envelope and may include a sheet of material for converting the energy from the electron beam into light with a wavelength that is compatible with the sensitivity of the photographic film. After the container has been irradiated, the photographic film is developed. Light and dark portions of the photographic film are analyzed to determine dose and distribution of dose.

One disadvantage of the photographic verification technique resides in the delays in developing and analyzing the film.

The present invention provides a new and improved radiation monitoring technique which overcomes the above referenced problems and others.

SUMMARY OF THE INVENTION

In accordance with the present invention, a method of irradiation is provided. Items are moved through a charged particle beam. Energy of the charged particle beam entering the item is measured and the energy of the charged particle beam exiting the item is measured.

In accordance with a more limited aspect of the present invention, the difference between the entering and exiting energies is used to determine absorbed dosage.

In accordance with another more limited aspect of the present invention, the difference between the entering and exiting beam energies is used to control at least one of the entering charged beam energy, and a speed of moving the items through the charged particle beam.

In accordance with another aspect of the present invention, an irradiation apparatus is provided. A charged beam generator generates and aims a charged particle beam along a preselected path. A conveyor conveys items to be irradiated through the beam. A first beam strength monitor is disposed between the item and the beam generator to measure a strength of the beam before entering the item. A second beam strength monitor monitors a strength of the beam after it is passed through the item.

In accordance with yet another aspect of the present invention, a charged particle beam detector is provided. The detector includes a ferrite member and a plurality of coiled windings disposed on the ferrite member.

One advantage of the present invention resides in the real time measurement of absorbed dose.

Another advantage of the present invention resides in more accurate determination of absorbed doses and reduces dosing errors.

Another advantage of the present invention resides in the automatic control and modification of an irradiation process on-line to assure prescribed dosing.

Still further advantages of the present invention will be apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 2 is a side sectional view of one of the detectors of FIG. 1 taken in a vertical plane perpendicular to the electron beam;

FIG. 3 is a perspective view of the ferrite element and coils of FIG. 2;

FIG. 4 is an alternate embodiment of the detector;

FIGS. 5(a) and 5(b) are side and top views of an irradiation system illustrating alternative detector placement; and, FIG. 6 is an elevational view of an irradiation system illustrating yet another placement of the detector array.

DETAILED DESCRIPTION OF THE PREFERRED EMBODIMENTS

Figure 1:
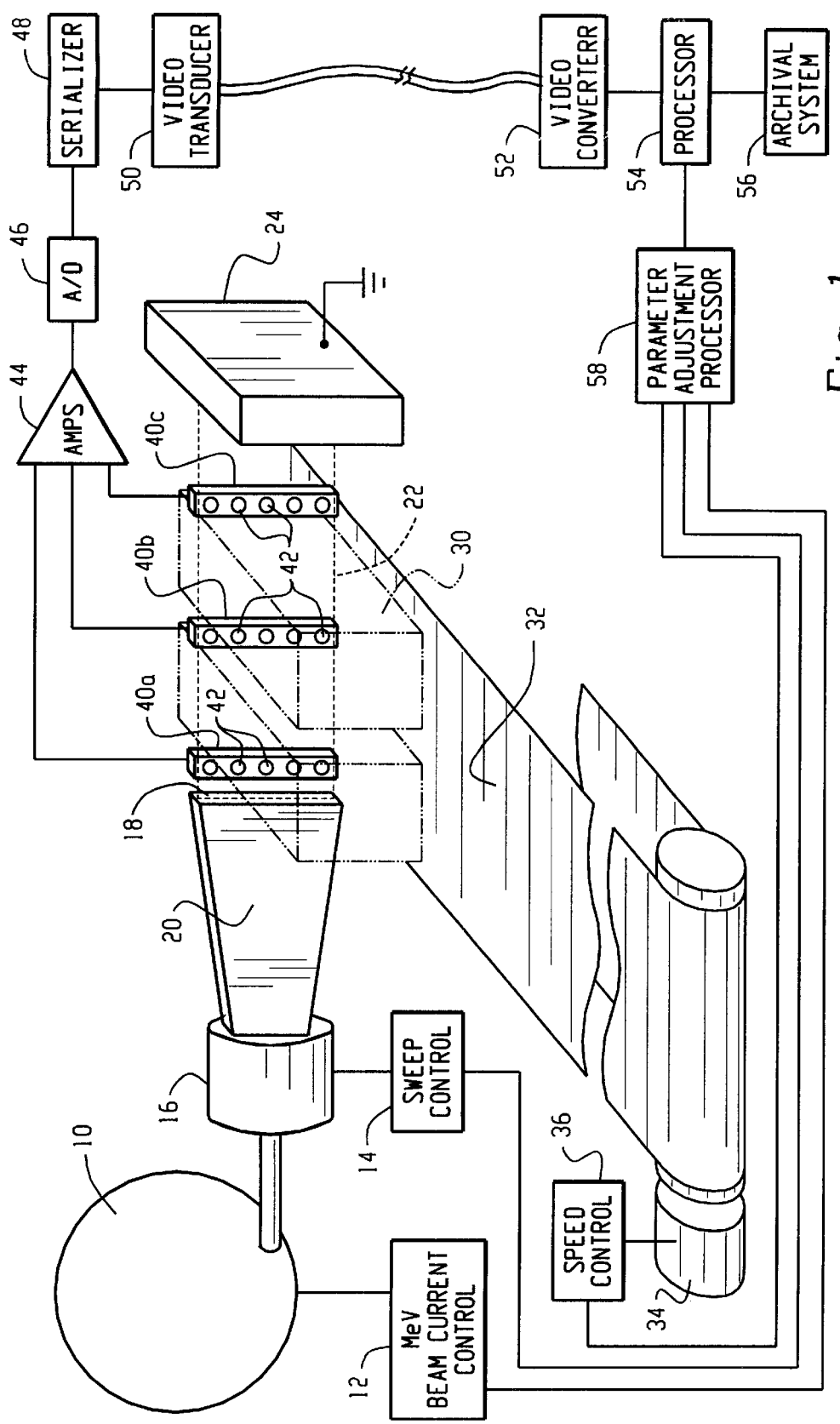
FIG. 1 is a perspective view of a e-beam irradiation system in accordance with the present invention.

With reference to FIG. 1, an accelerator 10 is controlled by a voltage and current controller 12 to generator a beam of electrons with a preselected energy (MeV) and beam current. Typically, the energy is in the range of 0.2–20 MeV and the beam current is in the range of 1–10 mA. A sweep control circuit 14 controls electromagnets or electrostatic plates of a beam deflection circuit 16 to sweep the electron beam, preferably back and forth in a selected plane. A titanium window 18 of a vacuum horn 20 defines the exit from the vacuum system from which the electron beam 22 emerges for the treatment process. An electron absorbing plate 24 collects electrons and channels them to ground.

A conveying system conveys items 30 through the e-beam 22. In the illustrated embodiment, the conveyor system includes a horizontal belt conveyor 32 which is driven by a motor 34. A motor speed controller 36 controls the speed of the motor. Of course, other types of conveyor systems are contemplated, including overhead conveyors, pneumatic or hydraulic conveyors, spaced palettes, and the like. In the preferred, belt conveyor system, two of the items 30 are positioned side by side on the conveyor belt close packed with a minimal gap in between. Preferably, the items are packages or palettes of fixed size which hold the item which hold individual items to be irradiated.

A plurality of radiation detector arrays 40a, 40b, 40c are positioned adjacent the e-beam 22. The first detector array 40a is in array of individual detectors 42 which measure the strength (electron current) of the electron beam at each of a plurality of distances from the conveyor prior to entering the first item. The second detector array 40b includes an array of individual detectors in the close packed space for detecting the strength of the e-beam after it has exited the first item and before it has entered the second. The third detector array 40c is an array of individual detectors which measures the strength of the beam at various locations after it has exited the second item. The outputs of all the individual detectors 42 are conveyed to an amplifier section 44 for amplification and, preferably, to an analog to digital converter 46 to be converted to digital format. In the preferred embodiment, the digital outputs are serialized 48, converted into video signals 50, and conveyed by coaxial cable to a remote location. The amplifier, the analog-to-digital converter and the serializer are shielded to protect the electronics from stray electrons and static fields that might interfere with the electronic processing. The video signal is conveyed to the location remote from such stray charges where it is converted to selected electronic format 52 and analyzed by a processor 54 such as a computer. The computer subtracts or otherwise compares the strength of the electron beam before and after it enters each item. The processor 54 further compares the strength of the beam at various distances from the conveyor (heights in the illustrated embodiment) to identify regions in which high density materials may be interfering with complete irradiation of the downstream material. The processor determines the dose received by each region of each item and forwards that dose information to an archival system 56 such as a computer memory, a tape, or a paper printout.

In a first alternate embodiment, the processor 54 compares the measured dose information with preselected dose requirements. Based on differences between the selected and actual dosage, a perimeter adjustment processor 58 adjusts one or more of the beam energy, the beam sweep, the conveyor speed, and the like. For example, when the detectors detect that the items are absorbing too much radiation leaving the far portions of the second item under irradiated, the parameter adjustment processor 58 increases or adjusts the accelerator to increase the MeV or the electron beam current, up to maximum values set for the items being irradiated. Once the maximum is reached, the adjustment processor 58 controls the motor speed controller 36 to reduce the speed of the conveyor.

When the items have small regions of higher density, the sensing of an increase in the absorbed radiation causes the parameter adjustment processor 58 to increase the energy of the electron beam or the speed of the conveyor until the region of higher density has passed through the beam. Thereafter, the beam power or the conveying speed can be reduced. Analogously, when the region of higher density is localized vertically, in the illustrated horizontal conveyor embodiment, the parameter adjustment processor 56 causing the sweep control circuit 14 to adjust the sweep such that the electron beam is directed to the higher density region for a longer duration. Preferably, the beam strength and the conveying speed are also adjusted to maintain the appropriate dosing in other regions of the package. Analogously, in response to regions of little absorption of the x-ray beam, the sweep circuit can be controlled to dwell for a shorter percentage of the time on these regions.

With reference to FIGS. 2 and 3, in the preferred embodiment, the individual detectors are inductive detectors that detect the increases and decreases in electron beam current as the electron beam is swept up and down, in the illustrated embodiment. That is, although the electron beam may be viewed as a beam that is the full width of the horn 20, more typically the beam of electrons is focused into about a two centimeter diameter line. This line is swept up and down rapidly compared to the speed of the conveyor such that the electron beam is effectively a wall. Nonetheless, as the beam is swept up and down, the intensity adjacent each of the individual detectors 42 changes inducing a current in the detector. More specifically to the preferred embodiment, each detector includes a magnetic field invisible housing 60 which supports an annular ferrite ring 62. In the embodiment to FIG. 2, the ferrite ring is disposed in a plane parallel to the plane of the electron beam 22. The ferrite ring is surrounded by a plurality of looped coils 64 which define a plurality of serially connected loops on the peripheral surface of the ferrite ring. The induced currents are typically quite small. The ferrite ring helps concentrate the flux changes to maximize the changes in the current induced in the loops 64. Other inductive detectors for detecting the electron beam are also contemplated. In the embodiment to FIG. 4, a plurality of coiled windings 64' are wound around a ferrite core which is connected with ferrite end caps 66. The inductive detector is mounted such that the end cap 66 is disposed in a plane parallel to the electron beam 22.

Other positions for the arrays of inductive detectors are also contemplated. In the embodiment of FIGS. 5a and 5b, the detector arrays are positioned directly upstream, downstream, or both upstream and downstream of each package. The array includes a plurality of detectors positioned parallel to the beam, i.e., extending from the side of the item toward the electron beam source to the side of the item away from the electron beam source. By having a plurality of detectors from front to back along the item, the relative dose attenuation along the item can be measured. In many applications, a single line of individual detectors is adequate. Preferably, a two-dimensional array of detectors is provided to measure the relative dose reduction at various height levels within the item.

The arrays can be mounted to the leading or trailing edges of the items to move with the items. Alternatively, a mechanical system is provided for inserting an array between each item and the next item. The mechanical arrangement is controlled to move to with the conveyor belt such that the array moves with the items. Once the upstream side of the item reaches the electron beam, the array(s) is lifted, moved upstream, and reinserted between the next pair of items.

With reference to FIG. 6, the array can also be positioned above the electron beam. As the beam moves closer and away from the detector array due to the sweeping action, corresponding currents are induced in the detector.

Other placements of the inductive detectors is also contemplated.

It is further to be appreciated that when other types of radiation are utilized, different detectors can be used analogously to control dosing of items conveyed past the radiation beam.

Although illustrated relatively large in comparison to the items, it is to be appreciated that the individual detectors can be quite small compared to the items and the number of the detectors in each array quite large, e.g., on the order of 10 to 100.

It is also to be appreciated that the electron beam can be swept in other dimensions. For example, the beam can also be swept parallel to the direction of motion of the conveyor. When the beam is swept in two dimensions, it cuts a large rectangular swath. The electron density entering a unit area of the item per unit time is lower, but the product remains within the beam longer. The side to side movement of the beam allows for the placement of a two dimensional array above or below the items to measure absorbed dose in two dimensions.

It is further to be appreciated that this detection system can be used to detect charged beams in numerous other applications. For example, this detector can be used in conjunction with electron beams that are used to create coatings by the synthesis of powdered material, such as diamond like coatings (dlc) on tools, nanophase silicon nitrite coatings, high purity metal coatings, and the like. It can be used with charged particle beams for surface modification such as cleaning of metals, surface hardening of metals, corrosion resistance, and other high temperature applications. The detector can also be used for electron beams which are used in the destruction of toxic gases such as the cleaning of flue gases for oxides of sulfur and nitrogen, removal of exhaust gases from diesel engines, destruction of fluorine gases, destruction of aromatic hydrocarbons, and the like. The invention may also be used with charged particle beams for treating liquid materials such as for the destruction of organic wastes, the breaking down of potentially toxic hydrocarbons such as tricloroethylenes, propanes, benzenes, phenols, halogenated chemicals, and the like, and for drying liquids, such as ink in printing machines, lacquers, and paints. The invention may also be used to monitor charged particles beams in the food industry such as the disinfection of food stuffs such as sugar, grains, coffee beans, fruits, vegetables, and spices, the pasteurization of milk or other liquid foods, sanitizing meats such as poultry, pork, sausage, and the like, inhibiting sprouting, and extending storage life. The invention will also find application in conjunction with monitoring electron and other charged particle beams used to form other particles or other types of radiation, such as the generation of ultraviolet irradiation, conversion of the electron beam to x-rays or gamma rays, the production of neutrons, eximer lasers, the production of ozone, and the like.

The invention may also be used to monitor charged particles beams in conjunction with polymers and rubbers. The e-beam irradiation can be used for the controlled cross linking of polymers, degrading of polymers, grafting of polymers, modification of plastics, polymerization of epoxy compounds, sterilization of polymer units, vulcanization of rubber, and the like.

It is to be appreciated that the determination of dose absorption can also be used to determine the local mass of the product.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of irradiating comprising:
   moving items through a charged particle beam;
   measuring energy of the charged particle beam entering the item; and,
   measuring energy of the charged particle beam exiting the item.

2. The method as set forth in claim 1 further including:
   determining a difference between the energy of the charged particle beam entering and exiting the item; and,
   determining an absorbed dosage of the charged particle beam.

3. The method as set forth in claim 2 further including:
   controlling at least one of a speed with which the items move through the charged particle beam and the energy of the charged particle beam in accordance with the determined absorbed dose.

4. The method as set forth in claim 1 wherein:
   the items are conveyed through the charged particle beam in a first direction; and,
   the charged particle beam is swept back and forth in a plane perpendicular to the first direction.

5. The method as set forth in claim 4 wherein the detecting of the charged particle beam includes inductively measuring changes in a charged particle beam current.

6. The method as set forth in claim 5 further including inductively measuring charged particle beam current at a plurality of locations along the item.

7. The method as set forth in claim 6 further including:
   determining reductions in the charged particle beam current at the various points along the item and determining absorbed dose for a plurality of regions of the item from the reduced current.

8. The method as set forth in claim 5 wherein the inductive detection of the charged particle beam current includes:
   concentrating magnetic flux changes attributable to the changing current with a ferrite member; and
   with concentrated magnetic flux changes, inducing electrical currents in windings of a coil.

9. The method as set forth in claim 1 wherein the charged particle beam is an electron beam.

10. An irradiation apparatus comprising:
    a charged particle beam generator for generating and aiming a charged particle beam along a preselected path;
    a conveyor which conveys items to be irradiated through the beam;

a first beam strength monitor disposed between the item and the beam generator for measuring a strength of the beam before entering the item; and, a second beam strength monitor for monitoring a strength of the beam after it has passed through the item.

11. The apparatus as set forth in claim 10 further including:

a processor for comparing the beam strengths measured by the first and second beam strength monitors and determining a dose of the charged particle beam absorbed by the item.

12. The apparatus as set forth in claim 11 wherein the processor is disposed remote from the monitors and further including:

a transducer for converting an output of the monitors into video signals, the transducer being disposed adjacent the monitors such that the output from the monitors is conveyed from the irradiation region in a video format.

13. The apparatus as set forth in claim 11 wherein the beam generator includes a beam strength control circuit for controlling at least one of charged particle beam voltage and current and wherein the conveyor includes a speed control circuit for controlling a speed with which the items are moved through the charged particle beam, and further including:

a parameter adjustment processor which compares the determined absorbed doses with target absorbed doses and selectively adjusts at least one of the beam strength control circuit and the conveyor speed control circuit.

14. The apparatus as set forth in claim 11 wherein the charged particle beam generator further includes a sweep control circuit for sweeping the charged particle beam back and forth across at least one of a planar region and a volumetric region and wherein the monitors each include:

an array of inductive couplers disposed adjacent the charged particle beam.

15. The apparatus as set forth in claim 14 wherein the array is disposed parallel to the charged particle beam.

16. The apparatus as set forth in claim 14 wherein each of the inductive sensors includes:

a ferrite core;

a plurality of coil windings disposed on the ferrite core.

17. The apparatus as set forth in claim 16 wherein the ferrite core includes a ferrite ring which is mounted parallel to the charged particle beam and wherein the coiled windings lie on a peripheral surface of the ferrite ring.

18. The apparatus as set forth in claim 16 wherein each individual sensor includes:

a ferrite pole which is disposed parallel to the charged particle beam;

a ferrite extension extending from the ferrite pole; and, a plurality of windings of a coil extending around the ferrite extension.

19. The apparatus as set forth in claim 10 wherein the charged particle beam generator includes an electron accelerator.

20. A charged particle beam detector comprising:

a ferrite ring which is mounted parallel to the charged particle beam; and a plurality of coil windings lying on a peripheral surface of the ferrite ring.

21. A charged particle beam detector comprising:

a ferrite pole which is disposed parallel to the charged particle beam;

a ferrite extension extending from the ferrite pole; and a plurality of coil windings extending around the ferrite extension.

22. An irradiation means comprising:

a means for moving items to be irradiated through a charged particle beam;

a means for measuring energy of the charged particle beam entering the item; and, a means for measuring energy of the charged particle beam exiting the item.

* * * * *